United States Patent
Subils Valls

[11] Patent Number: 5,820,134
[45] Date of Patent: Oct. 13, 1998

[54] DRILL CHUCK FOR MACHINE TOOLS

[75] Inventor: Francisco Subils Valls, L'Hospitalet de Llobregat, Spain

[73] Assignee: Llambrich Precision, S.A., L'Hospitalet de Llobregat, Spain

[21] Appl. No.: 604,984
[22] PCT Filed: Jun. 26, 1995
[86] PCT No.: PCT/ES95/00081
  § 371 Date: Mar. 13, 1996
  § 102(e) Date: Mar. 13, 1996
[87] PCT Pub. No.: WO96/03244
  PCT Pub. Date: Feb. 8, 1996

[30] Foreign Application Priority Data

Jul. 22, 1994 [ES] Spain ..................................... 9401624

[51] Int. Cl.$^6$ ................................................. B23B 31/173
[52] U.S. Cl. ................. 279/61; 279/60; 279/902
[58] Field of Search ............... 279/60–64, 902, 279/39, 53, 65; 409/234

[56] References Cited

U.S. PATENT DOCUMENTS

| | | | |
|---|---|---|---|
| 1,750,023 | 3/1930 | Prigan | 279/60 |
| 1,789,601 | 1/1931 | Sjorgren | 279/53 |
| 4,260,169 | 4/1981 | Hall | 279/62 |
| 4,902,025 | 2/1990 | Zimdras | 279/60 |

FOREIGN PATENT DOCUMENTS

| | | | |
|---|---|---|---|
| 696.938 | 1/1931 | France . | |
| 2.040.429 | 1/1971 | France . | |
| 2612820 | 9/1978 | France | 279/902 |
| 270.058 | 12/1981 | Spain . | |
| 509786 | 2/1982 | Spain . | |

*Primary Examiner*—Steven C. Bishop
*Attorney, Agent, or Firm*—Jacobson, Price, Holman & Stern, PLLC

[57] ABSTRACT

The machine-tool drill chuck is comprised of a main cylindrical hollow body (2) linked by its rear end (13) to the machine tool and provided at its front end (15) with a front conical socket (7), inside which is located another socket (9) carrying clamping jaws (8) for holding the drill and which are subject to the action of a pushing screw (6) which is coaxial with the main body. Windows (12) are arranged as through openings in the main body. In each of the windows there is arranged a satellite gear (4) whose axis is parallel to the axis of the main body (2) and whose diameter is substantially larger than the thickness of the main body wall. The satellite gears are in mesh with the external toothing of a central gear (3) and with the internal toothing of an external ring (5) which may be actuated manually or with a key. Said central gear is also internally in mesh with the pushing screw.

1 Claim, 2 Drawing Sheets

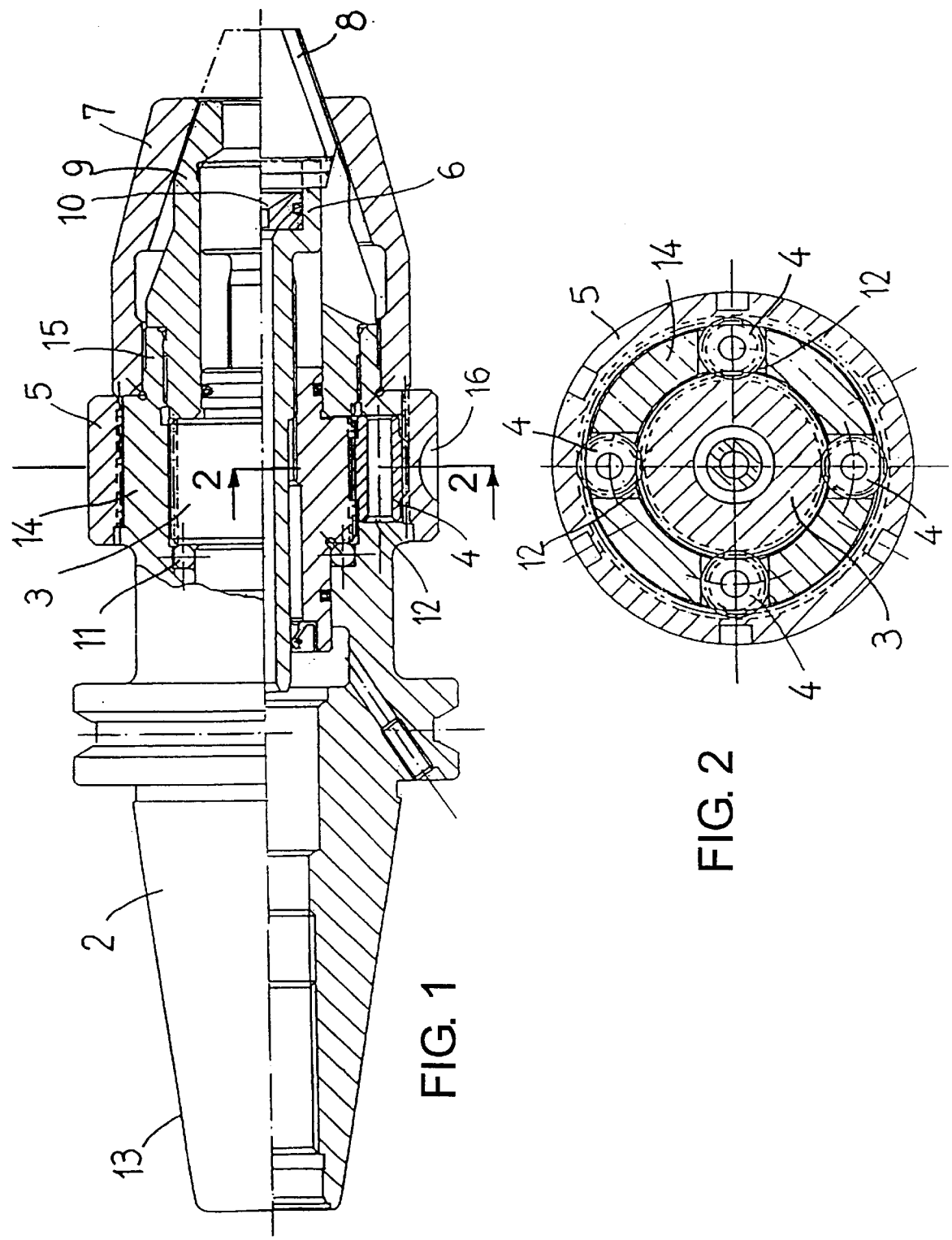

DRILL CHUCK FOR MACHINE TOOLS

TECHNICAL FIELD

The invention refers to a drill chuck for machine tools or to be more precise, to a system for opening, closing and attaching tools, such as twist drills, and which enables the tool to turn in both directions and which can be equipped with an internal refrigeration system.

STATE OF THE ART

The drill chucks are devices attached to both portable and automatic machine tools to clamp tools, such as twist drills of several diameters, and which must be able to transmit the cutting force and show the accuracy required in each application. The drill chucks can be used with portable machines, such as Do-It-Yourself (DIY) or industrial machines, and stationary machines which can be individual work stations or multi-tool machines, such as machining centres.

In the portable machines, the drill chucks closing mechanism can be activated manually or by using an auxiliary key. These drill chucks for portable machines are less accurate, with run-outs exceeding 0.2 mm. The drill chucks closing mechanism for stationary machines can be operated with a self-locking device or an auxiliary key. The accuracy of the self-locking drill chucks ranges from a run-out exceeding 0.1 mm, which is equivalent to low accuracy, up to 0.04 mm which is high. The drill chucks closed with an auxiliary key are used for medium and high quality work.

The systems currently known and used as high accuracy drill chucks, particularly for machining centres are the self-locking system auxiliary key clamping systems.

In the self-locking system, once the tool has been placed in its housing, it is manually attached by turning the outside of the drill chuck. As the direction in which the screw threads making up the attachment system are cut in a direction opposite to the drill chuck drive axis rotation, due to the drill chuck's actual resistance to rotate with regard to the tool, this means that, in operation, the drill chuck tightly closes the jaws that firmly support the tool while the task is carried out.

The disadvantage of this system is that, in operation, it can only be driven to rotate in one single direction, because if it were rotated in the opposite direction, the jaws would loosen and therefore not support nor clamp the tool firmly enough. Another disadvantage is the difficulty in loosening the tool when it has to be changed, because owing to the said induced clamping the drill chuck holds the tool very tightly, as a result of the self-locking system's actual design.

Furthermore, the design of the conventional self-locking drill chucks has an additional disadvantage which is the difficulty to attach them to a tool cooling system during operation.

A further disadvantage of conventional self-locking drill chucks is that when using high operating speeds, if the machine stops suddenly, for any reason, it may cause the drill chuck to loosen, thus running the risk that the tool may be dropped.

The other known system is the auxiliary key clamping device. Two recognised technologies are currently used in this system:

a) Worm meshing with a crown gear;
b) Bevel pinion meshing with crown gear.

In the first, the auxiliary key acts upon a worm screw, which in turn rotates a toothed crown gear which, as it is internally threaded, advances or withdraws the drill chuck's internal screw. This advancing and withdrawing of the drill chuck's internal screw draws together or separates the jaws that clamp the tool, respectively.

In a system such as this, the clamping force is exercised on one or two of the worm gear teeth, which increases the risk of a worm breakage as a consequence of a high gear ratio between the worm and the number of teeth in the crown gear. Consequently, the auxiliary key has to be turned 60 and 90 times to achieve the maximum drill chuck jaw opening which is approximately 13 mm. In addition, as the worm screw has to be positioned externally tangent to the drill chuck, the latter remains dynamically unbalanced.

In the second case, instead of acting on the worm screw, the auxiliary key acts on a bevel gear which in turn transfers its rotary movement to a crown gear, which works as described in the previous example. However, as the crown gear-pinion gear ratio is about three times greater, it is only necessary to turn the auxiliary key approximately, 25 or 30 turns. Nevertheless, the crown gear-pinion meshing is irregular because of its friction against its own housing, and this friction makes the movement awkward and unreliable. As per the previous example, the dynamic balance is also inferior.

Consequently, both the known technologies applied to the auxiliary key clamping systems have serious disadvantages because, owing to the design drawbacks, the key has to be turned many times in order to vary the gripped diameter, narrowing and widening the space between them. The operator himself has to apply the final degree of pressure to the jaws, thus helping to clamp the tool, which can work in both rotary directions.

A further disadvantage of these systems is that the manual auxiliary key must be used all the time the tool is clamped or loosened.

Furthermore, owing to the systems's actual design, consisting of a worm screw or bevel gear auxiliary mechanism that applies pressure on only one side, the drill chuck is dynamically unbalanced as the said mechanism is asymmetrical. However, this system operates more accurately than the self-locking one.

INVENTION DESCRIPTION

The aim of this invention is to produce a drill chuck that, as well as avoiding all the aforementioned disadvantages in the known conventional systems, also combines the accuracy of the self-locking systems with the operating performance of the auxiliary key closing systems which enables two-way turning.

The main feature of the drill chuck herein described is that its main body has at least two open passages, and inside each of these there is a planetary pinion with its axis parallel to that of the main body and with a diameter slightly greater than the main body wall thickness; the planetary pinions that mesh with the external toothing of a central pinion which is in turn screwed onto the jaw pushing screw, and the internal toothing of an outside ring, which can be operated manually or with a key.

In accordance with another of the invention's properties, the said outside ring is fitted with one or more external recesses that are adapted to hold the protrusions of an auxiliary tightening key.

The drill chuck herein described shows the following advantages:

a) It increases operational accuracy;
b) Less time is required to prepare the drill chuck, because to clamp the tool, the key does not need to be turned so many times.

c) The tool can be driven in both directions;

d) It has a symmetrical design and is therefore dynamically balanced;

e) Cooling fluid can pass effectively and easily through to the tool;

f) Its simple design reduces manufacturing costs.

BRIEF DESCRIPTION OF THE DRAWINGS

The enclosed drawings which do not limit the design to that shown on the drawing, indicate how this drill chuck works.

FIG. 1. shows a partial cross sectional drawing of a drill chuck such as that described herein;

FIG. 2. is an enlarged view of section 2—2 in FIG. 1., showing the four planetary pinions that rotate the central pinion, which in turn acts on the main body of the drill chuck;

PREFERENTIAL DESIGN OF THE INVENTION

Figure 3:
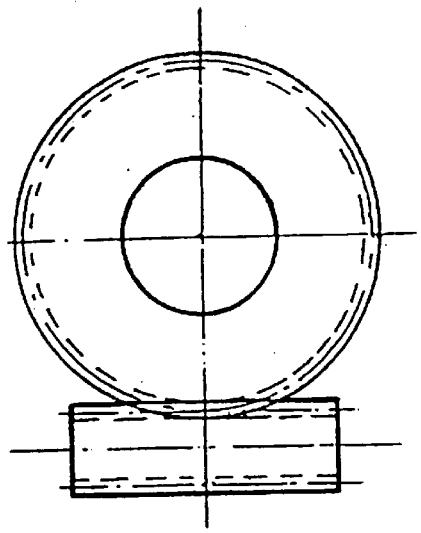
FIG. 3 and 4. show front and side diagrammatical views, respectively, of the conventional design of worm screw auxiliary key operated systems, whilst FIGS. 5. and 6. show two diagrammatical views, analogous to those shown in FIGS. 3 and 4., of the conventional design of bevel gear auxiliary key operated systems.
Figure 4:
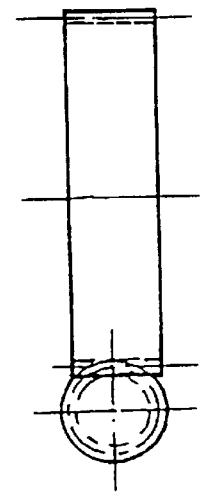
Figure 5:
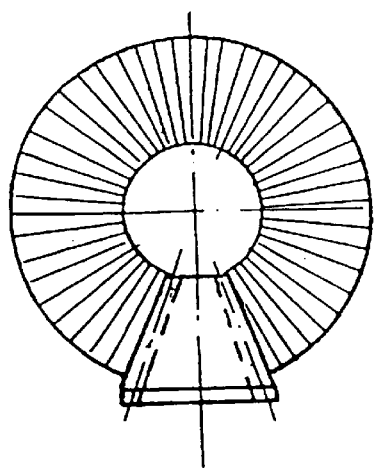
Figure 6:
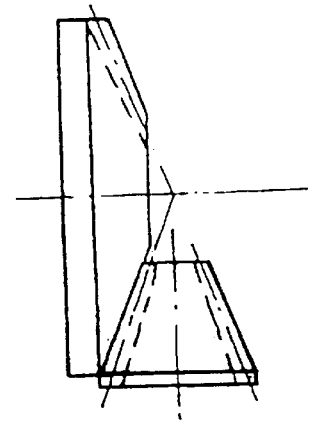

FIG. 1. shows the preferred design of a drill chuck as per that detailed in the invention, consisting of a main body (2), which has a tapered shank suitable for attaching it to the machine tool driving system, a central pinion (3), and at least one cylindrical planetary pinion (4), an outside ring (5), a pushing screw (6) with jaws (8), a front conical bushing (7), a jaw guide (9), an internal tool end seating bushing (10) and bearing balls (11).

The main body (2) has a hollow, cylindrical front part or extension (15) with different interior diameters, that allow through passage in the axial direction of the jaw guide (9), the central pinion (3) and the balls (11). Also, the end of the said part (15) is suitably shaped to house in the front conical bushing (7).

The said main body (2) has an intermediate part (14), peripherally toothed so as to mesh with the outside ring (5), the internal diameter of which allows the passage of the central pinion (3). Said intermediate part (14) has equally distanced full wall openings (12) in which the corresponding planetary pinions (4) can be housed.

The main body (2) also shows an external conical end section (13) that has been shaped externally to be coupled to the tool machine's driving system, and internally to house the tie-rod that attaches the drill chuck to the machine tool and the cooling medium supply duct, or a suitably shaped auxiliary stopper.

The externally toothed central pinion (3) meshes with one or more planetary pinions (4) and has an internally threaded axial hole to couple it with the jaw (8) pushing screw (6).

The outside ring (5) is internally toothed so as to mesh with one or more planetary pinions (4) and has at least one peripheral groove (16) suitably shaped for inserting an auxiliary key.

The end of the jaw (8) pushing screw (6) is suitably shaped to couple the tool clamping and fastening jaws (8).

The description of the parts that make up the drill chuck herein described, is followed by an explanation of how the said chuck's operates.

Firstly, the outside ring (5) is turned manually, and this turns the planetary pinions (4) which, in turn, drive the central pinion (3), which consequently, screws the jaw (8) pushing screw (6) on or off. The jaws (8) that clamp and fasten the machine's tools rest on the front end of this screw (6), and when the said screw (6) advances or withdraws, the clamping jaws move closer together or separate, respectively, from each other owing to the conical shape of the internal surface of the conical front bushing (7), thus firmly clamping or loosening the tool, respectively.

An auxiliary key inserted into the grooves (16) of the outside ring (5) is to be used only at the end of the previously described operation, to improve or guarantee the perfect clamping of the twist drill or tool.

Following a sufficiently detailed description of the nature of the invention and how it operates, it is to be stated that provided its basic principle is not altered, changed or modified, it can all be varied in detail, as the essential features and the reason for requesting the patent, is as described in the following patent claims.

I claim:

1. A machine-tool drill chuck comprising:

a main cylindrical hollow body having several internal diameters;

a rear end of said main body being used for coupling the chuck to a machine-tool driving system;

a front end of said main body being coupled to a guiding conical socket for jaws;

an intermediate part said main body including at least two through openings;

a central pinion being externally toothed, said central pinion being housed in a central cylindrical portion provided at the intermediate part of the main body and having a central, axial opening being threadingly meshed with a pushing screw of the jaws, said pushing screw being axially movable through the central pinion and the intermediate part of the main body to open and close the jaws;

an outside ring internally toothed to be manually operated; and at least two planetary pinions housed in the respective at least two through openings of the main body and being externally toothed respectively, said planetary pinions projecting into the main body and out of the main body at said at least two through opening at a periphery of said intermediate part of said main body and having a diameter greater than a thickness of a wall of the main body at said intermediate part, said planetary pinions meshing with the internal toothed surface of the outside ring and with the externally toothed surface of the central pinion, and transmitting a rotating motion, in both directions, as applied by the user to the outside ring, to the central pinion so that the central pinion transmits the axial motion to the pushing screw for opening and closing the jaws.

* * * * *